United States Patent
Paila et al.

(10) Patent No.: US 9,906,832 B2
(45) Date of Patent: Feb. 27, 2018

(54) METHOD AND APPARATUS FOR CONFIGURING PRESENTATION OF SERVICE GUIDES

(75) Inventors: Toni Juhani Paila, Helsinki (FI); Ilkka Antero Oksanen, Espoo (FI)

(73) Assignee: Conversant Wireless Licensing S.a r.l., Luxembourg (LU)

( * ) Notice: Subject to any disclaimer, the term of this patent is extended or adjusted under 35 U.S.C. 154(b) by 0 days.

(21) Appl. No.: 12/776,040

(22) Filed: May 7, 2010

(65) Prior Publication Data

US 2010/0287461 A1   Nov. 11, 2010

Related U.S. Application Data

(60) Provisional application No. 61/176,702, filed on May 8, 2009.

(51) Int. Cl.
| | | |
|---|---|---|
| G06F 17/24 | (2006.01) | |
| H04N 21/435 | (2011.01) | |
| H04N 21/235 | (2011.01) | |
| H04N 21/2362 | (2011.01) | |
| H04N 21/434 | (2011.01) | |
| H04N 21/84 | (2011.01) | |
| G06F 17/25 | (2006.01) | |
| H04H 60/72 | (2008.01) | |
| H04H 60/73 | (2008.01) | |

(52) U.S. Cl.
CPC ......... *H04N 21/435* (2013.01); *H04N 21/235* (2013.01); *H04N 21/2362* (2013.01); *H04N 21/4345* (2013.01); *H04N 21/84* (2013.01); *H04H 60/72* (2013.01); *H04H 60/73* (2013.01)

(58) Field of Classification Search
CPC ...................................................... G06F 17/218
USPC .......................................................... 715/236
See application file for complete search history.

(56) References Cited

U.S. PATENT DOCUMENTS

| | | | |
|---|---|---|---|
| 6,005,631 | A | 12/1999 | Anderson et al. |
| 6,540,142 | B1 | 4/2003 | Alleshouse |

(Continued)

FOREIGN PATENT DOCUMENTS

| | | | |
|---|---|---|---|
| CN | 1327655 A | 12/2001 | |
| CN | 1866253 A | 11/2006 | |

(Continued)

OTHER PUBLICATIONS

Gencipinar et al. "MPEG-7 based Service Guide for Moble TV", 2007, ICST, pp. 1-6.*

(Continued)

*Primary Examiner* — James J Debrow
(74) *Attorney, Agent, or Firm* — Conversant Wireless Licensing

(57) ABSTRACT

An approach is provided for presenting service guides. A head-end platform generates a service guide fragment and inserts a tag into the service guide fragment to generate a modified service guide fragment. The head-end platform then causes, at least in part, transmission of the modified service guide fragment. A user equipment receives the service guide fragment and detects the tag in the service guide fragment. The user equipment then determines a transformation type based, at least in part, on the tag. The user equipment causes, at least in part, performing of the transformation and output of a transformed presentation.

13 Claims, 9 Drawing Sheets

(56) References Cited

U.S. PATENT DOCUMENTS

| | | | |
|---|---|---|---|
| 6,643,652 B2* | 11/2003 | Helgeson et al. | |
| 7,277,928 B2* | 10/2007 | Lennon | 709/219 |
| 7,373,651 B2* | 5/2008 | Palazzo | H04N 7/163 348/E7.061 |
| 7,380,206 B1 | 5/2008 | Usuda | |
| 7,487,448 B2* | 2/2009 | Emerson et al. | 715/255 |
| 7,533,406 B2* | 5/2009 | Ludvig et al. | 725/110 |
| 7,631,328 B2 | 12/2009 | Clancy et al. | |
| 8,520,703 B2* | 8/2013 | Huttunen | H04N 21/235 370/473 |
| 9,331,802 B2* | 5/2016 | Jansky | H04H 60/39 |
| 2002/0151327 A1 | 10/2002 | Levitt | |
| 2003/0084449 A1* | 5/2003 | Chane et al. | 725/46 |
| 2003/0120758 A1 | 6/2003 | Yassin et al. | |
| 2004/0040036 A1 | 2/2004 | An | |
| 2006/0019618 A1 | 1/2006 | Seppala | |
| 2006/0037076 A1* | 2/2006 | Roy | 726/22 |
| 2006/0173868 A1 | 8/2006 | Jurgen et al. | |
| 2006/0212902 A1* | 9/2006 | Seo et al. | 725/39 |
| 2006/0225093 A1* | 10/2006 | Huttunen et al. | 725/39 |
| 2007/0072543 A1 | 3/2007 | Paila et al. | |
| 2007/0086465 A1* | 4/2007 | Paila | H04H 60/72 370/394 |
| 2007/0101352 A1 | 5/2007 | Rabina et al. | |
| 2007/0180467 A1* | 8/2007 | Lee | H04N 5/44543 725/39 |
| 2007/0192687 A1 | 8/2007 | Simard et al. | |
| 2007/0294249 A1* | 12/2007 | Feyaerts | 707/6 |
| 2008/0072254 A1 | 3/2008 | Jung et al. | |
| 2008/0127290 A1* | 5/2008 | Delegue et al. | 725/114 |
| 2009/0013352 A1 | 1/2009 | Lee et al. | |
| 2009/0055868 A1 | 2/2009 | Wehmeyer et al. | |
| 2009/0094644 A1* | 4/2009 | Jung et al. | 725/39 |
| 2009/0132687 A1 | 5/2009 | Yue et al. | |
| 2009/0144771 A1* | 6/2009 | Bangma et al. | 725/39 |
| 2009/0172726 A1 | 7/2009 | Vantalon et al. | |
| 2009/0193462 A1* | 7/2009 | Kim | H04N 5/44543 725/39 |
| 2009/0254481 A1* | 10/2009 | Lee et al. | 705/51 |
| 2009/0258594 A1* | 10/2009 | Martin-Cocher et al. | 455/3.06 |
| 2010/0037258 A1* | 2/2010 | Chitturi et al. | 725/39 |
| 2010/0180310 A1* | 7/2010 | Lee et al. | 725/54 |
| 2011/0055415 A1* | 3/2011 | Cuesta et al. | 709/231 |

FOREIGN PATENT DOCUMENTS

| | | |
|---|---|---|
| EP | 1100269 | 5/2001 |
| EP | 1134918 | 9/2001 |
| EP | 1686495 | 8/2006 |
| EP | 1914986 | 4/2008 |
| JP | 2001-024996 | 1/2001 |
| JP | 2001-086078 | 3/2001 |
| WO | WO 03/053041 A2 | 6/2003 |
| WO | WO 2007/086683 A1 | 8/2007 |
| WO | WO 2009/109976 A2 | 9/2009 |

OTHER PUBLICATIONS

OMA-BCAST-v1_1-2009-0030, Rich Media Support for SG, Feb. 2009, pp. 1-8.

OMA-TS-BCAST_Service_Guide-V1_0-20090212-A, Service Guide for Mobile Broadcast Services, Version 1.0, Feb. 12, 2009, pp. 1-232.

International search report and written opinion for corresponding international application No. PCT/IB2010/052036 dated Sep. 14, 2010, pp. 1-14.

EP Extended Search Report dated Jul. 13, 2012 from counterpart EP Application No. 10772085.6.

Non-Final Rejection dated Mar. 20, 2013 in Korean counterpart application No. 10-2011-7029390 (4 pages).

RU counterpart 2011149589/07 (Nokia Corporation), Patent Office of the Russian Federation, (office action), dated Sep. 7, 2012 (3 pages).

RU counterpart 2011149589/07 (Nokia Corporation), Patent Office of the Russian Federation, (office action), dated Sep. 7, 2012 (2 pages).

Digital Video Broadcasting (DVB); IP Datacast over DVB-H; Electronic Service (ESG), ETSI TS 102 471, v. 1.2.1, Nov. 2006, France (pp. 48-52 and 65).

* cited by examiner

METHOD AND APPARATUS FOR CONFIGURING PRESENTATION OF SERVICE GUIDES

RELATED APPLICATIONS

This application claims the benefit of the earlier filing dates under 35 U.S.C. § 119(e) of U.S. Provisional Application Ser. No. 61/176,702 filed May 8, 2009, entitled "Method and Apparatus for Configuring Presentation of Service Guides," the entirety of which is incorporated herein by reference.

BACKGROUND

Wireless (e.g., cellular) service providers and device manufacturers are continually challenged to deliver value and convenience to consumers by, for example, providing compelling network services, applications, and content, as well as user-friendly devices. Important differentiators in this industry are application and network services. In particular, these services can include video and television applications including an electronic service guide. Technology can be used to improve compatibility and efficiency of electronic service guide information using user equipment including mobile devices.

SUMMARY

Therefore, there is a need for an approach for customizing electronic service guides using a head-end system and various user equipment.

According to one embodiment, a method comprises generating a service guide fragment. The method also comprises inserting a tag into the service guide fragment to generate a modified service guide fragment. The method further comprises causing, at least in part, transmission of the modified service guide fragment.

According to another embodiment, an apparatus comprising at least one processor, and at least one memory including computer program code, the at least one memory and the computer program code configured to, with the at least one processor, cause, at least in part, the apparatus to generate a service guide fragment. The apparatus is also caused to insert a tag into the service guide fragment to generate a modified service guide fragment. The apparatus further causes, at least in part, transmission of the modified service guide fragment.

According to another embodiment, a computer-readable storage medium carrying one or more sequences of one or more instructions which, when executed by one or more processors, cause, at least in part, an apparatus to generate a service guide fragment. The apparatus is also caused to insert a tag into the service guide fragment to generate a modified service guide fragment. The apparatus further causes, at least in part, transmission of the modified service guide fragment.

According to another embodiment, an apparatus comprises means for generating a service guide fragment. The apparatus also comprises means for inserting a tag into the service guide fragment to generate a modified service guide fragment. The apparatus further comprises means for causing, at least in part, transmission of the modified service guide fragment.

According to another embodiment, a method comprises receiving a service guide fragment. The method also comprises detecting a tag in the service guide fragment. The method further comprises determining a transformation type based, at least in part, on the tag. The method further comprises causing, at least in part, performing of the transformation. The method further comprises causing, at least in part, outputting of a transformed presentation.

According to another embodiment, an apparatus comprising at least one processor, and at least one memory including computer program code, the at least one memory and the computer program code configured to, with the at least one processor, cause, at least in part, the apparatus to receive a service guide fragment. The apparatus is also caused to detect a tag in the service guide fragment. The apparatus is further caused to determine a transformation type based, at least in part, on the tag. The apparatus is further caused to perform the transformation. The apparatus is further caused to output a transformed presentation.

According to another embodiment, a computer-readable storage medium carrying one or more sequences of one or more instructions which, when executed by one or more processors, cause, at least in part, an apparatus to receive a service guide fragment. The apparatus is also caused to detect a tag in the service guide fragment. The apparatus is further caused to determine a transformation type based, at least in part, on the tag. The apparatus is further caused to perform the transformation. The apparatus is further caused to output a transformed presentation.

According to yet another embodiment, an apparatus comprises means for receiving a service guide fragment. The apparatus also comprises means for detecting a tag in the service guide fragment. The apparatus further comprises means for determining a transformation type based, at least in part, on the tag. The apparatus further comprises means for causing, at least in part, performing of the transformation. The apparatus further comprises means for causing, at least in part, outputting of a transformed presentation.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENTS

A method and apparatus for improving the presentation of service guide information using a mobile device. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to mobile devices and application services, it is contemplated that the approach described herein may be used with other devices and applications.

Figure 1:
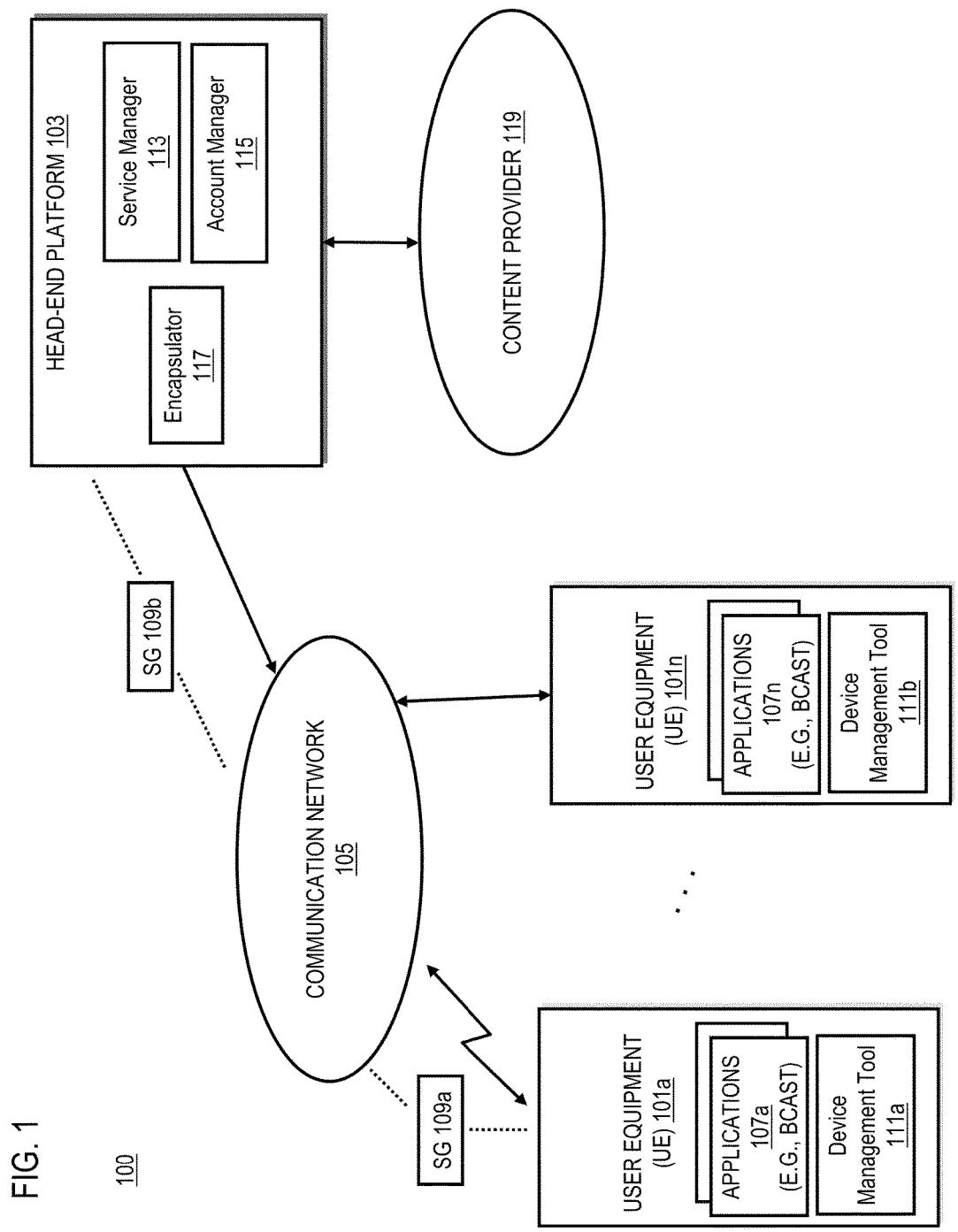
FIG. 1 is a diagram of a system capable of providing customizable service guide data to a user equipment, according to one embodiment.

FIG. 1 is a diagram of a system 100 capable of providing media broadcasts to user equipments, according to one embodiment. For the purposes of illustration, the system 100 provides for media broadcasts, such as radio, television, streaming video, etc., on one or more user equipment (UEs 101*a*-101*n*, also collectively referred to as UEs 101). In one embodiment, a UE 101 receives and processes service guide data along with the broadcast. An electronic service guide (ESG) is a service discovery tool for client consumers (users) and for client applications on a UE 101, such as a mobile terminal. The electronic service guide can provide consumers with rich, up-to-date, information about services. For example, for sports broadcasts, a service guide data stream includes athlete information and for movie broadcasts, a service guide data stream includes actor or character information in addition to basic program information, such as start and end times. The electronic service guide also serves as mobile terminal middleware with signaling data to enable service lookup from a broadcast data stream and playback with correct client software and codecs. Additionally, electronic service guides can enable, for instance, a mobile television device to automatically discover the service platforms and services available in a usage area and can prompt a user to make content purchases. Electronic service guides also help content providers strengthen customer loyalty through brand imagery and trademark usage.

As shown in FIG. 1, the system comprises one or more user equipment (UEs) 101*a*-101*n*, having connectivity to a head-end platform 103 via a communication network 105. Communications may include electronic service guide data, which according to some embodiments conform to the Open Mobile Alliance (OMA) Mobile Broadcast Services Enabler Suite (BCAST) standard, which is a global specification for mobile television and on-demand video services that can be adapted to Internet Protocol or peer to peer contend delivery. The standard is designed to support broadcast technologies including Digital Video Broadcasting—Handheld (DVB-H), $3^{rd}$ Generation Partnership Program (3GPP)—Multimedia Broadcast Multicast Service (MBMS), $3^{rd}$ Generation Partnership Program 2 (3GPP2)—Broadcast and Multicast services (BCMCS), and mobile unicast streaming systems including, but not limited to, Wireless LAN (WLAN), WiMAX and cellular streaming. The standard uses an eXtensible Markup Language (XML) stack and service guide structures for electronic service guides. The information contained in electronic service guide data can be represented in a rich media format with minimal changes to the standard. These media formats can be configurable for different mobile devices as well as user preferences.

The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the UEs 101*a*-101*n* execute respective broadcast applications 107*a*-107*n* (also collectively referred to as broadcast applications 107) running, for instance, under a BCAST standard. The broadcast application accepts and processes service guide (SG) fragments (e.g., SGs 109*a* and 109*b*, also collectively referred to as SGs 109) from the head-end platform 103. A user may use a device management tool (e.g., device management tools 111*a*-111*n*, also collectively referred to as device management tools 111) to configure the service guide preferences on the UE 101. In one embodiment, the device management tool 111 configures transformation documents to customize service guide presentations.

A SG fragment 109, according to the BCAST embodiment, is in XML and can be used to configure the presentation of an electronic service guide. Extensible Stylesheet Language Transformation (XSLT) documents can be provided via a Device Management (DM) service as management objects or via file delivery. XSLT documents can be used to transform the SG fragments 109 into a user viewable presentation. For instance, the XSLT documents can be used to enforce a particular representation of the service guide, e.g., a generic default mode that is compatible with most devices. Additionally, XSLT documents can be used to map multiple service guide fragments 109 without identifying those fragments 109 into a single representation. Also, XSLT documents can be used for a broadcasting system to declare and a client device to identify a representation root document, which can be used to configure an electronic service guide.

By way of example, the communication network 105 of the system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In this example, the UEs 101 can communicate with the head-end platform 103 over the communication network 105 using standard protocols. The UEs 101 and the platform 103 are network nodes with respect to the communication network 105. In this context, a protocol includes a set of rules defining how the network nodes within the communication network interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are effected, for example, by exchanging discrete packets of data. Each packet comprises, for example, (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol indicates, for example, a type for the next protocol contained in its payload. The higher layer protocol is said to be encapsulated in the lower layer protocol. The headers included in a packet traversing multiple heterogeneous networks, such as the Internet, include, for example, a physical (layer 1) header, a data-link (layer 2) header, an internetwork (layer 3) header and a transport (layer 4) header, and various application headers (layer 5, layer 6 and layer 7) as defined by the OSI Reference Model.

According to one embodiment, the head-end platform 103 includes a service manager 113, an account manager 115, and an encapsulator 117. In this example, the head-end platform 103 utilizes a broadcast mechanism to deliver ESGs, and thus, the service manager 113, account manager 115 and encapsulator 117 can as be referred to as a broadcast service manager, broadcast account manager, and broadcast encapsulator, respectively. It is contemplated that other delivery mechanisms can be utilized. In one embodiment, a content provider 119 can provide information to the head-end platform 103 service and content information via a channel. By way of example, the channel can be scrambled or encrypted for security purposes and decryption codes can be sent as well. The service manager 113 can process the content provider's information feed. According to one embodiment, the service manager 113 can control encapsulation, multicast routing, encryption, electronic service guide generation, and digital rights management. The service manager 113 sends processed content provider data to an encapsulator 117 that can take the information streams produced by a broadcast service manager 113 and encapsulate them into a format that a UE 101 can process. For example, the broadcast service manager 113 can process a content provider service guide data stream into XML-based SG fragments 109 that a UE 101 can process. A broadcast encapsulator 117 can then transmit the encapsulated information feed to UEs 101 via a broadcast network such as the DVB-H network or a 3GPP network. The data can be transmitted, for example, through an asynchronous serial interface.

In one embodiment, a broadcast account manager 115 receives UE 101 purchase information and other usage data via a communication network 105 and sends the data to a broadcast service manager 113. In addition or alternatively, the broadcast service manager 113 can also receive usage data directly from a UE 101. In certain embodiments, a Content Management Licensing Administrator (CMLA) or similar service is used to account for data rights management while a billing mechanism such as a mobile phone or credit card service may be used to charge the user for services, such as subscriptions or pay per view purchased on a UE 101. Some broadcast services may also be offered as clear-to-air. Additionally, advertisements can be utilized as a payment mechanism by allowing the user to choose an electronic service guide advertisement as the payment method.

Figure 2B:
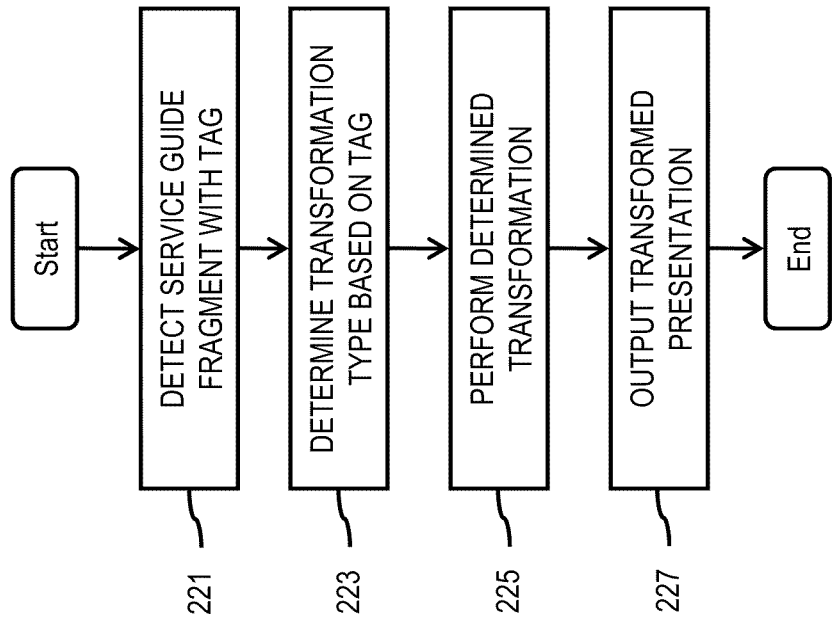
FIG. 2B is a flowchart of a processing electronic service guide fragments into a user readable format, according to one embodiment.
Figure 2A:
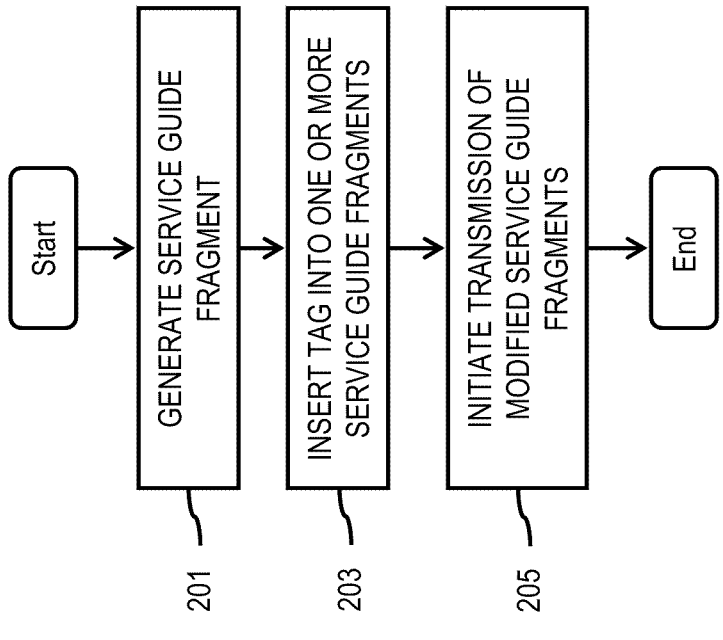
FIG. 2A is a flowchart of a process for generating customizable electronic service guide data, according to one embodiment.

FIG. 2A is a flowchart of a process for generating customizable electronic service guide data, according to one embodiment. In one embodiment, the head-end platform 103 or one or more components of the head-end platform 103 performs the process 200. Initially at step 201, a SG fragment 109 is generated at the head-end system 103. The broadcast service manager 113 generates a service guide stream by processing the content provider 119 data stream and creates the SG fragments 109 by controlling the broadcast encapsulator 117. At step 203, the head-end platform 103 inserts a tag into one or more SG fragments 109. The tag identifies a transformation that can transform the service guide fragment 109 or a group of fragments 109 into a user viewable format. In one embodiment, the tag can be an element just after the starting tag of the service guide fragment 109. Once the SG fragments 109 are generated and tagged, the head-end platform 103 initiates a transmission of the modified SG fragments 109 to UEs 101.

FIG. 2B is a flowchart of a processing electronic service guide fragments into a user readable format, according to one embodiment. In one embodiment, the UE 101 or a component of the UE 101 (e.g., an application 107) performs the process 220. At step 221, the UE 101 receives a SG fragment 109 and detects if the SG fragment 109 has a tag. In one embodiment, the UE 101 can identify a tag using an identifier (e.g., an assistance identifier) or by using globally agreed to parameters. Once the tagged SG fragment 109 is identified, the UE 101 determines which transformation or transformation type to use based, at least in part, on the tag (step 223). The transformation to be used is then located and used for processing (step 225). Other SG fragments 109 found, for instance, by associated universal resource identifier (URI) and/or universal resource locator (URL) information are used as the input to the transformation. In one embodiment, the other SG fragments 109 comprise the presentation on which the transformation is to be applied. In step 227, the transformation is performed and a transformed presentation is outputted. In one embodiment, the transformation can be different for different UEs 101, giving the user the ability to customize the user's media. The UE 101 can then render outputted data for the user.

Under the above approach, a user can customize the service guide features. Additionally, a user (operator or content provider) can select and/or control a presentation format among a number of representations by changing the transformation. This process can also be used to enable different devices to render the service guide content in a customized way with minimal changes to existing service guide fragments and with minimal replication of service guide fragments.

Figure 3:
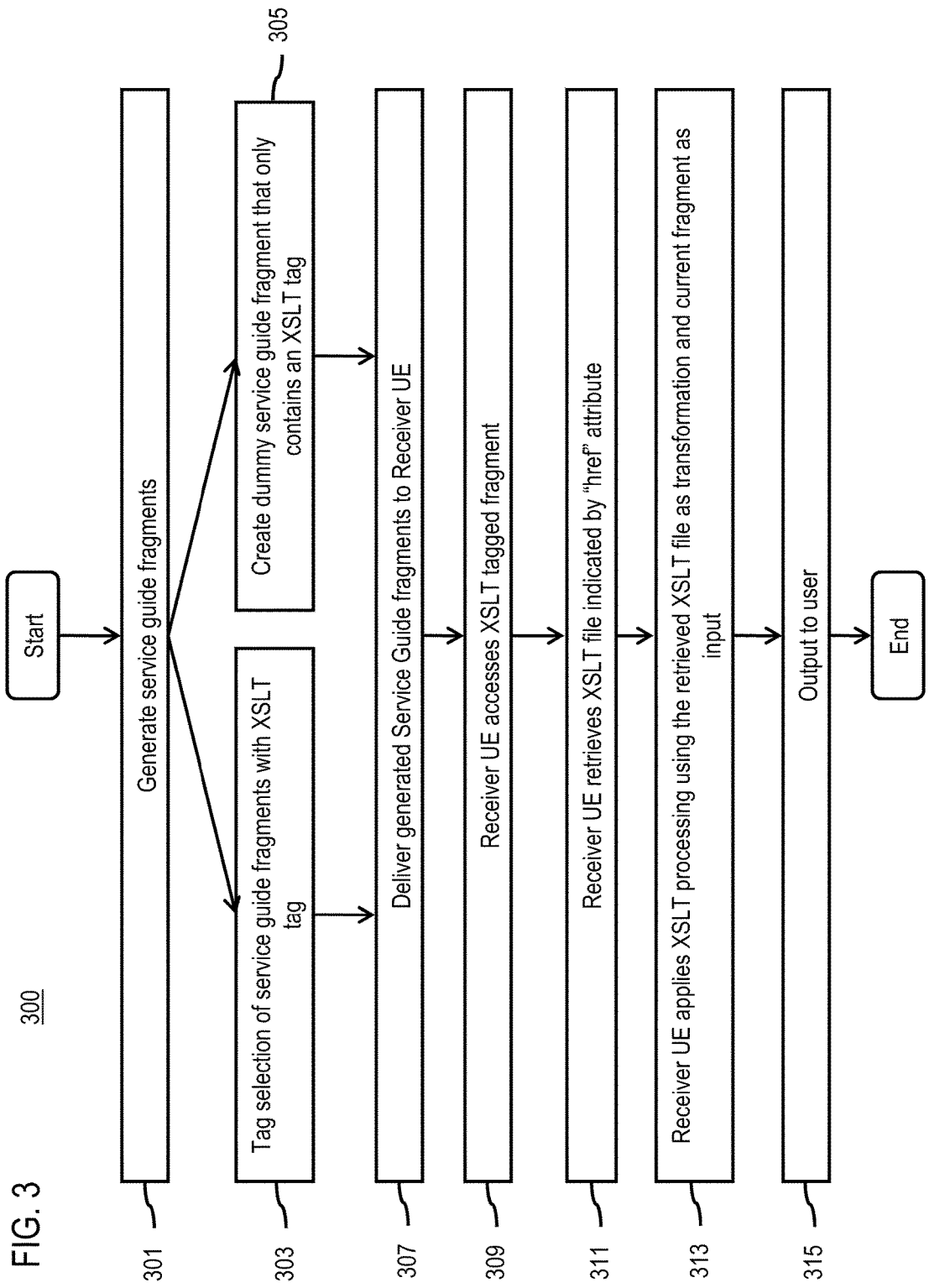
FIG. 3 is a flowchart of a process for generating and processing electronic service guide data, according to one embodiment.

FIG. 3 is a flowchart of a process for a configurable electronic service guide, according to one embodiment. In one embodiment, the head-end platform 103, one or more components of the head-end platform 103, a UE 101, one or more components of the UE 101, or a combination thereof perform the process 300. At step 301, a head-end platform 103 generates service guide fragments 109 using a broadcast service manager 113 and a broadcast encapsulator 117. A broadcast service manager 113 can receive content information from a content provider 119 to generate service guide data based on the content information. Service guide data generated can adhere to various specifications such as the OMA BCAST service guide structure. The head-end platform 103 can thus format the service guide data into a format that can be read by a UE 101. In step 303, when generating service guide fragments 109 from the service guide information, the broadcast encapsulator 117 tags a selection of service guide fragments 109 with an XSLT tag. Alternatively, the head-end platform 103 can create a dummy service guide fragment that contains an XSLT tag (step 305). The XSLT tag can include an element such as "<?xml-stylesheet type="text/xsl" href="transform.xsl"?>" just after the starting tag "<?xml version="1.0"?>" of the service guide fragment 109. The selection of service guide fragments 109 can be, for example, all service fragments 109, one service fragment 109 per operator, all scheduled fragments 109, one fragment 109 of each kind, etc., or combination of selected service fragments 109. The head-end platform 103 can then deliver or otherwise cause transmission of the service guide fragments to UEs 101 (step 307).

At step 309, a UE 101 receives and processes the service guide fragments 109 sent by the head-end platform 109. The UE 101 then accesses and processes the XSLT tagged fragments 109. The UE 101 can retrieve the XSLT file that is indicated by the "href" attribute in the fragment (step 311). For example, the target of "href" can be named as localhost://oma-dm-controlled-transform.xsl. The UE 101 then applies XSLT processing using, for instance, the retrieved XSLT file as a transformation and the current fragment 109 as the input file (step 313). If a dummy file is used, it will point to the XSLT file, which could be used as the transformation thereafter while the current fragment inputs change. The XSLT file can source a number of fragments 109 together by using the XSLT built-in function document ( ). The document ( ) function takes a uniform resource identifier (URI) as input defining the file to use as the source. The UE 101 can choose which fragments to transform in the XSLT and whether to use interactive retrieval formats, such as the OMA BCAST interactive retrieval of service guide fragments URI-format. An example of using the OMA BCAST interactive retrieval of service guide fragments URI-format is shown in Table 1 below. Table 1 describes an example XSLT transformation that uses multiple source fragments 109 and selects the fragments 109 indirectly using the OMA BCAST interactive SG delivery URI format. Additionally, the URI can be any other URI or Uniform Resource Locator (URL) that is resolved to a service guide fragment 109 resource such as an XML document, a File Delivery over Unidirectional Transport (FLUTE) URL, or a Hypertext Transport Protocol (HTTP) URL.

TABLE 1

```
<xsl:stylesheet xmlns:xsl="http://www.w3.org/1999/XSL/Transform" version="1.0">
    <xsl:output method="xml"/>
        <xsl:template match="fragment">
            <fragment>
                <xsl:apply-templates
                select="document('localhost://internalSgServer?fragmentType=2')"/>
                <xsl:apply-templates/>
                <xsl:apply-templates
                select="document('localhost://internalSgServer?validTo=345276698')"/>
                <xsl:apply-templates/>
            </fragment>
        </xsl:template>
</xsl:stylesheet>
```

In one embodiment, a local transform.xsl identifies the filename of the transformation to be used. It can be defined and varied by the sender of the service guide or it can be globally agreed to point to a certain name. For example, the target of "href" can be named as localhost://oma-dm-controlled-transform.xsl. In this example, all XSLT declarations would have exactly the same string. A device management tool 111 on each UE 101 or another means of configuring files and parameters on the UE 101 can be used to define the content for the file addressed by localhost://oma-dm-controlled-transform.xsl. This could be different for each UE 101. For example, one UE 101 can set a preference to have the service guide color red, while another UE 101 selects blue. Additionally, a UE 101 can have separate characteristics for each programming channel. Also, a content provider could choose to customize its service guide operations with the provider's colors or trademark. Certain UEs 101 may have additional functionality that can be utilized that other UEs 101 cannot; a user can have the option to turn these functions on.

Figure 6:
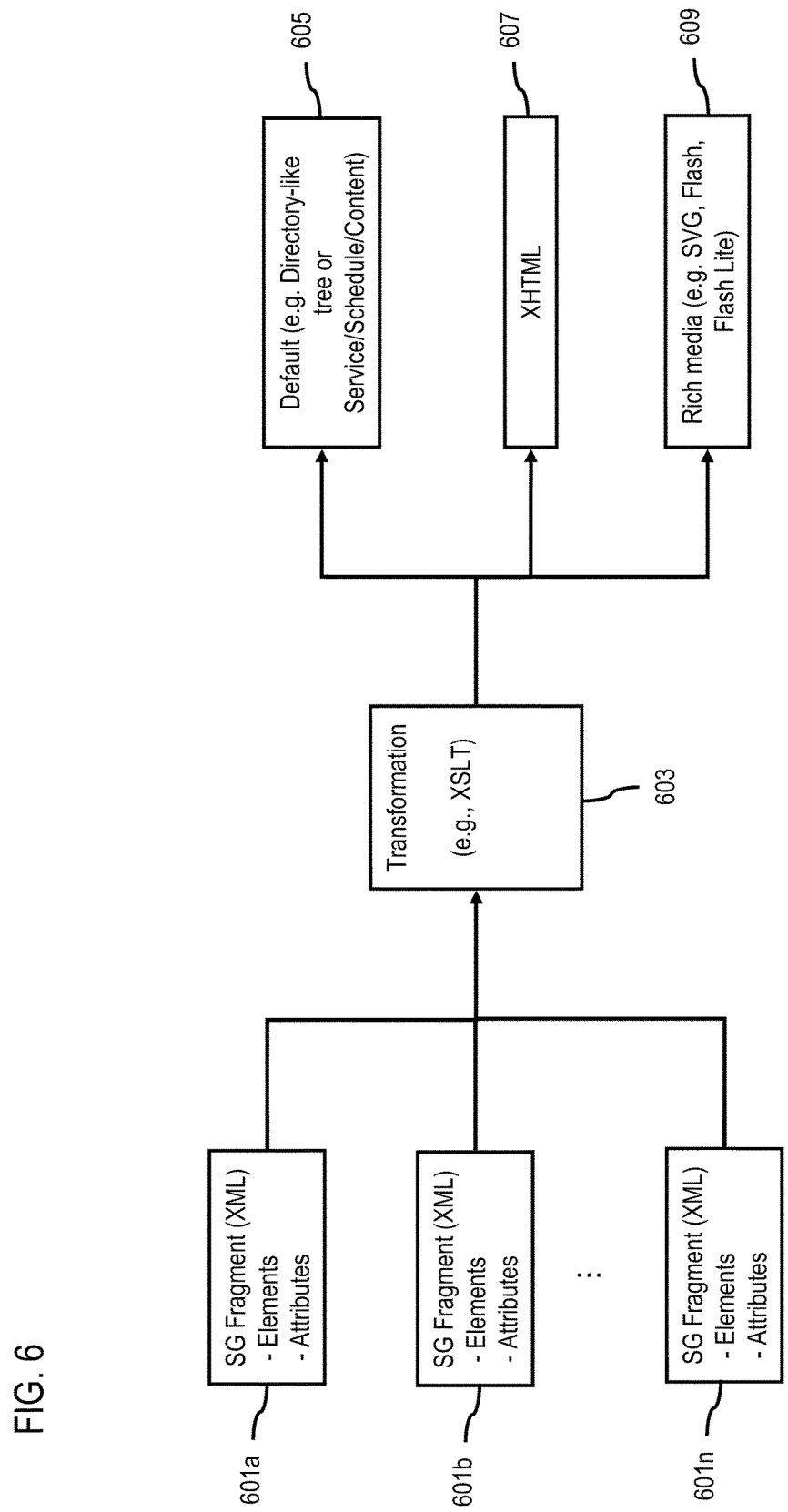
FIG. 6 is a black box diagram of a process for transforming service guide fragments into user viewable media, according to one embodiment.

Once the service guides are processed, the output (step 315), as shown in FIG. 6, can be a default directory-like tree or service, schedule, and content model, an Extensible HyperText Markup Language (XHTML) file, or scalable vector graphics (SVG) file that can be rendered in a web browser or SVG player on the UE. Additionally, the output can have multiple parts, for instance, one part defining Session Description Protocol (SDP) formatted entry to a Rich Media Environment (RME) or Dynamic Interactive Multimedia Scenes (DIMS) stream and another part representing the initial SVG scene to be rendered. Thus, a first UE 101 can render service guide fragments, their elements, and attributes and what those represent according to a predefined representation, while a second UE 101 can render the same fragments as an XHTML web page representation, or mobile optimized web page, and a third UE can render the same fragments as a SVG, Flash, Flash Lite, or other rich media representation.

Under the above approach, a user can customize the service guide features. Additionally, a user (operator or content provider) can select and/or control a presentation format among a number of representations. This process can also be used to enable different devices to render the service guide content in a customized way with minimal changes to existing service guide fragments and with minimal replication of service guide fragments.

Figure 4:
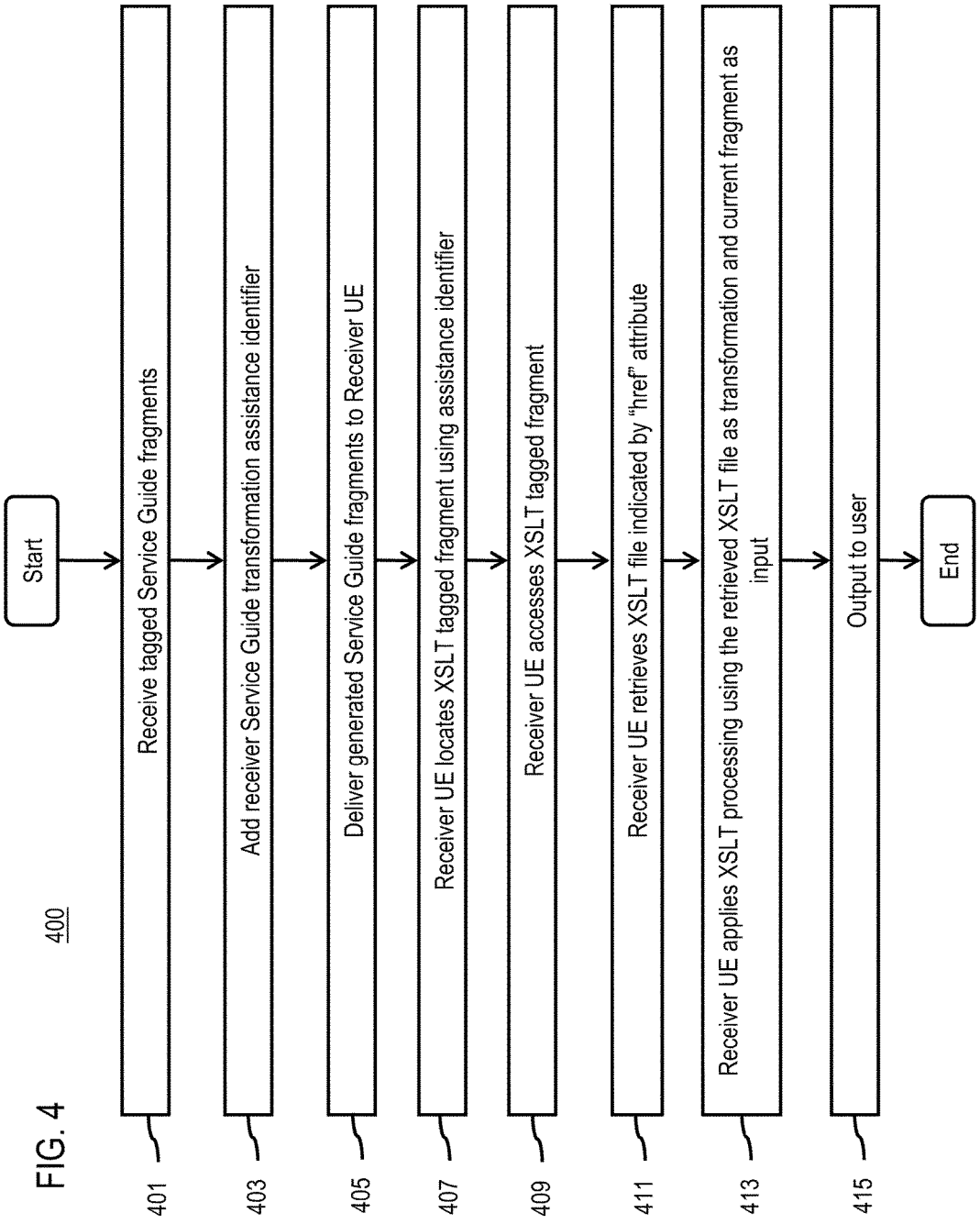
FIG. 4 is a flowchart of a process for processing electronic service guide data with identifiers, according to one embodiment.

FIG. 4 is a flowchart of a process for a configurable electronic service guide with identifier assistance, according to one embodiment. In one embodiment, the head-end platform 103, one or more components of the head-end platform 103, a UE 101, one or more components of the UE 101, or a combination thereof perform the process 400. In the process 400, the head-end platform 103 can provide assistance to a UE 101 to identify service guide fragments 109 tagged with an XSLT tag. A step 401, the head-end platform 103 receives and/or generates tagged service guide fragments according to the processes described previously. Next, an assistance identifier or other identifier can be added to the service guide fragments 109 to identify tagged or modified service guide fragments 109 (step 403). For example, for an OMA BCAST configuration, new information can be included in a Service Guide Delivery Descriptor (SGDD). A SGDD is transported on a Service Guide Announcement Channel and informs a UE 101 of availability, metadata, and grouping of the fragments 109 of the service guide during the service guide delivery process. A UE 101 can identify service guide fragments 109 that are either cached in the UE 101 or currently being transmitted. The SGDD can provide the grouping of related service guide fragments 109 and thus a means to determine the completeness of the group. An SGDD "RepresentationRoot" E1 element can be added in the SGDD. The element can contain for example a fragment identification of the fragment 109 that carries a dummy service guide fragment that contains an XSLT transformation tag. Alternatively, an SGDD E4 element or attribute "HasXsltTag" with a Boolean value under an E3 element fragment can be added to signal that the current fragment 109 contains the XSLT tag. The service guide fragments 109 can then be delivered to UEs 101 (step 405).

A UE 101 can then receive service guide fragments 109 with identifier assistance. If an identifier is provided, the UE 101 attempts to find the tags identified using a known identification mechanism (step 407). If the UE 101 finds the assisting tags, the UE 101 searches for and accesses the fragments 109 that were tagged to contain the XSLT transformation tag (step 409). The UE 101 then retrieves the XSLT file indicated by, for instance, the "href" attribute of the tag (step 411). Once the XSLT tag is retrieved, the tag and service guide fragments 109 can be processed as noted above (step 413) and outputs the transformation or a corresponding transformed presentation to the UE 101 (step 415).

Under the above approach, customized electronic service guide displays can be achieved with minimal modification of existing OMA BCAST or other mobile broadcasting standards. This also provides compatibility between different UEs 101 and between different generations of UEs 101.

Figure 5:
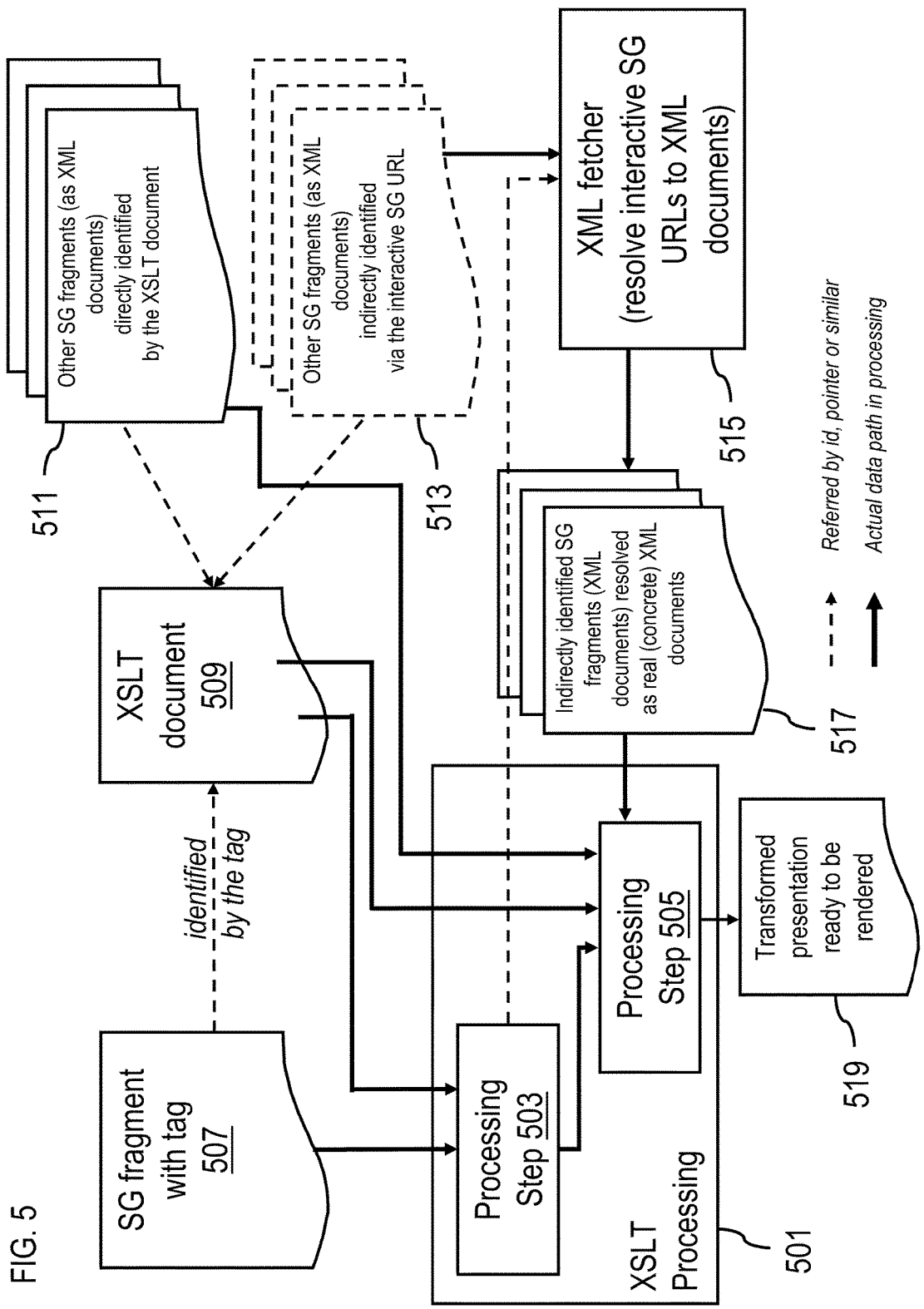
FIG. 5 is a flow diagram of a process for client-side processing of electronic service guide data, according to one embodiment.

FIG. 5 is a flow diagram of a process for client-side processing of electronic service guide data, according to one embodiment. In one embodiment, the head-end platform 103, one or more components of the head-end platform 103, a UE 101, one or more components of the UE 101, or a combination thereof perform the process 400. In the approach described herein, a UE 101 can receive and process service guide fragments 109 with or without tags. As shown, in one embodiment, XLST Processing 501 comprises a processing step 503 and a processing step 505. In this example, processing step 503 determines if a service guide fragment 507 has a tag. The tag can point to or otherwise identify an XSLT document 509 that contains a transformation to process the service guide information. The XSLT document 509 can identify other SG fragments 511 used in the processing process. Other SG fragments 513 can be indirectly identified using, for instance, an interactive service guide URL. An example would be using the OMA BCAST interactive retrieval of service guide fragments URI-format as shown in Table 1 above. Additionally, the URI can be any other URI or Uniform Resource Locator (URL) that is resolved via an XML fetcher 515 to a service guide fragment resource such as an XML document, a File Delivery over Unidirectional Transport (FLUTE) URL, or a Hypertext Transport Protocol (HTTP) URL. The interactive SG URLS can then be resolved into complete XML documents 517 (e.g., indirectly resolved service guide fragments resolved as real or concrete XML documents) to be used in processing step 505.

In processing step 505, these identified SG fragments and XML documents are transformation inputs, and the XSLT document is the transformation that is to be used to process the SG fragments into a presentation 519 that can be rendered by a UE 101.

FIG. 6 is a black box diagram of a process for transforming service guide fragments into user viewable media, according to one embodiment. As shown in FIG. 6, SG fragments 601a-601n and their included elements and attributes can be processed based on the transformation 603 (e.g., XSLT) defined in a tag of one or more of the fragments 601a-601n. In one embodiment, the output of the processing can be a default directory-like tree or service, schedule, and content model 605; an Extensible HyperText Markup Language (XHTML) file 607, or rich media 609 (e.g., scalable vector graphics (SVG) file) that can be rendered in a web browser or media player (e.g., SVG player) on the UE 101. Additionally, the output can have multiple parts, for instance, one part defining Session Description Protocol (SDP) formatted entry to a Rich Media Environment (RME) or Dynamic Interactive Multimedia Scenes (DIMS) stream and another part representing the initial SVG scene to be rendered. Thus, a first UE 101 can render service guide fragments 601a-601n, their elements, and attributes and what those represent according to a predefined default representation, while a second UE 101 can render the same fragments 601a-601n as an XHTML web page representation, or mobile optimized web page, and a third UE 101 can render the same fragments 601a-601n as a SVG, Flash, Flash Lite, or other rich media representation.

The processes described herein for providing service guide transformations for these applications may be implemented via software, hardware, e.g., general processor, Digital Signal Processing (DSP) chip, an Application Specific Integrated Circuit (ASIC), Field Programmable Gate Arrays (FPGAs), etc., firmware or a combination thereof. Such exemplary hardware for performing the described functions is detailed below.

Figure 7:
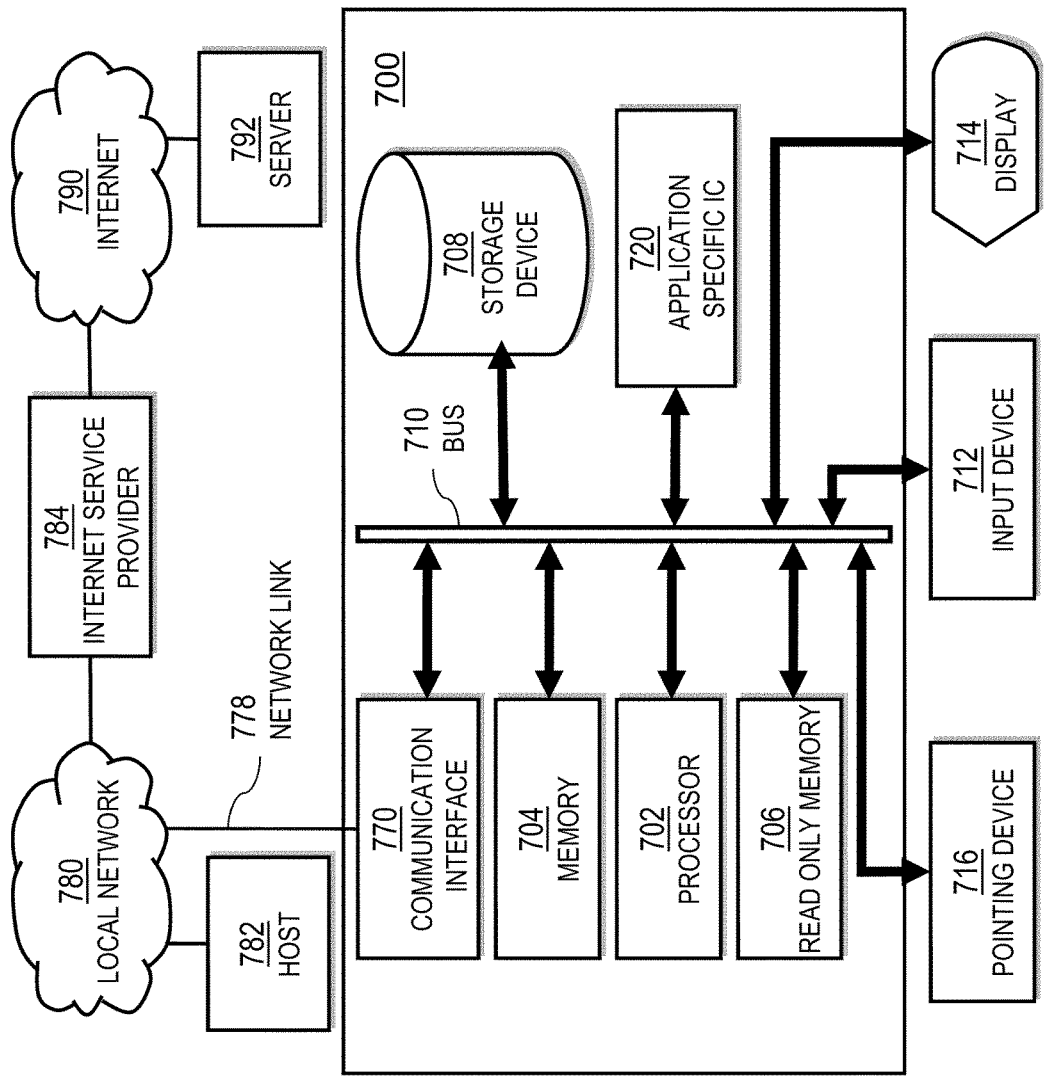
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide service guide transformations as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing service guide transformations.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to provide service guide transformations. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for providing service guide transformations. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing service guide transformations, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing service guide transformations to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
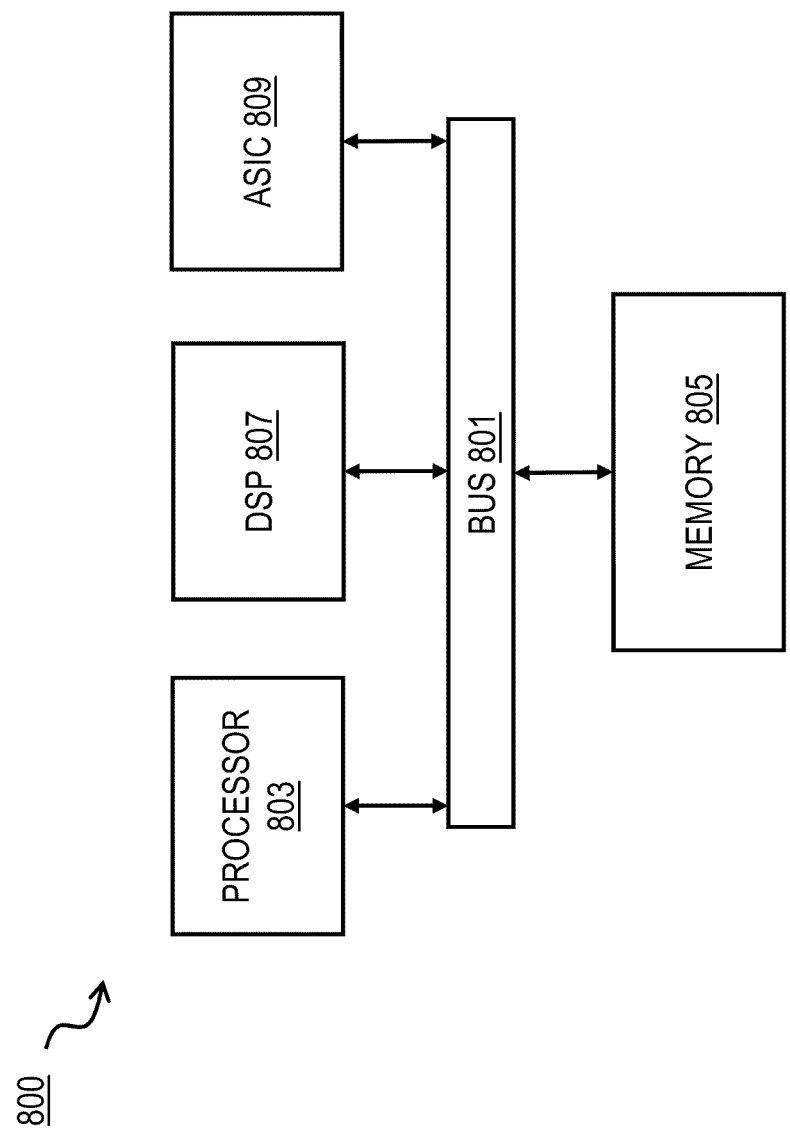
FIG. 8 is a diagram of a chip set that can be used to implement an embodiment of the invention.

FIG. 8 illustrates a chip set or chip 800 upon which an embodiment of the invention may be implemented. Chip set 800 is programmed to provide service guide transformations as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of services. Chip set or chip 800, or a portion thereof, constitutes a means for performing one or more steps of providing service guide transformations.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide service guide transformations. The memory 805 also stores the data associated with or generated by the execution of the inventive steps.

Figure 9:
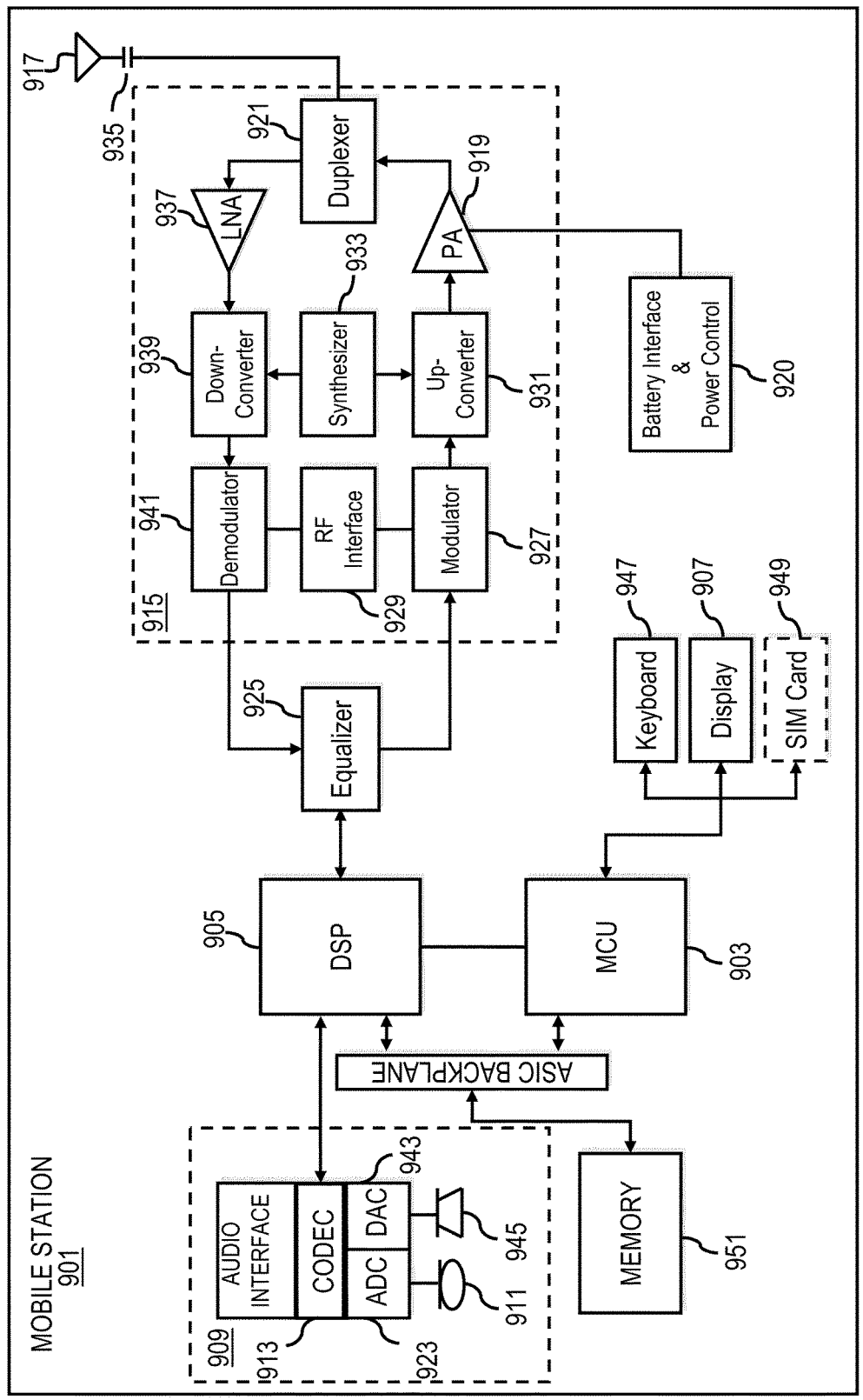
FIG. 9 is a diagram of a mobile station (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 900, or a portion thereof, constitutes a means for performing one or more steps of providing service guide transformations. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing service guide transformations. The display 9 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide service guide transformations. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method of providing a customized electronic service guide at a device, comprising:
   receiving a service guide fragment at the device;
   based on information included in an assistance identifier, detecting a tag in the service guide fragment wherein the tag points to a local document on the device, the local document identifying transformation of service guide fragments into a user viewable format according to one or more user preferences configurable at the device;
   determining a transformation for one or more service guide fragments based, at least in part, on contents of the local document pointed to by the tag;
   transforming the one or more service guide fragments based, at least in part, on the transformation, into the user viewable format; and
   outputting an electronic service guide comprising the transformed service guide fragments at the device.

2. A method of claim 1, further comprising:
   determining one or more other service guide fragments to process.

3. A method of claim 1, wherein the tag points to an Extensible Stylesheet Language Transformation (XSLT), and wherein the service guide fragment is eXtensible Markup Language (XML)-based.

4. A method of claim 1, further comprising:
   causing, at least in part, a control of a presentation format associated with the processed service guide fragment among one or more presentation formats based, at least in part, on the transformation type.

5. A method of claim 1, wherein the tag is an href attribute of the service guide fragment, the href attribute pointing to the local document.

6. An apparatus comprising:
   at least one processor; and
   at least one memory including computer program code for one or more programs,
   the at least one memory and the computer program code configured to, with the at least one processor, cause the apparatus to perform at least the following,
   receive a service guide fragment wherein a tag points to a local document on the apparatus, the local document identifying a transformation of service guide fragments into a user viewable format according to one or more user preferences configurable at the apparatus;
   based on information included in an assistance identifier, detect the tag in the service guide fragment;

determine a transformation for once or more service guide fragments based, at least in part, on contents of the local document pointed to by the tag;

transform the one or more service guide fragments based, at least in part, on the transformation, into the user viewable format; and output an electronic service guide comprising the transformed service guide fragments at the apparatus.

7. An apparatus of claim 6, wherein the apparatus is further caused to:

determine one or more other service guide fragments to process.

8. An apparatus of claim 6, wherein the tag points to an Extensible Stylesheet Language Transformation (XSLT), and wherein the service guide fragment is eXtensible Markup Language (XML)-based.

9. An apparatus of claim 6, wherein the at least one memory, the computer program code and the processor are further configured to cause the apparatus to:

control a presentation format of the transformed service guide fragment among one or more presentation formats based, at least in part, on the transformation type.

10. An apparatus of claim 6, wherein the tag is an href attribute of the service guide fragment, the href attribute pointing to the local document.

11. A device comprising:

a receiver for receiving a service guide fragment; and a processor configured to execute a computer program stored in a memory to:

detect, based on information included in an assistance identifier, a tag in the service guide fragment, wherein the tag points to a local document on the device, the local document identifying a transformation that can be used to transform service guide fragments into a viewable format according to one or more user preferences configurable at the device, transform one or more service guide fragments based at least in part on the transformation into the viewable format, and output an electronic service guide comprising the transformed service guide fragments to a display on the device.

12. A device according to claim 11, wherein the transformation type is Extensible Stylesheet Language Transformation (XSLT), and wherein the service guide fragment is eXtensible Markup Language (XML)-based.

13. A device according to claim 11, wherein the tag is an href attribute of the service guide fragment, the href attribute pointing to the document within the device.

* * * * *